Rudolf Halder
Hansjürgen Ullrich
Horst Schreiber
INVENTORS

BY Curtis, Morris & Safford

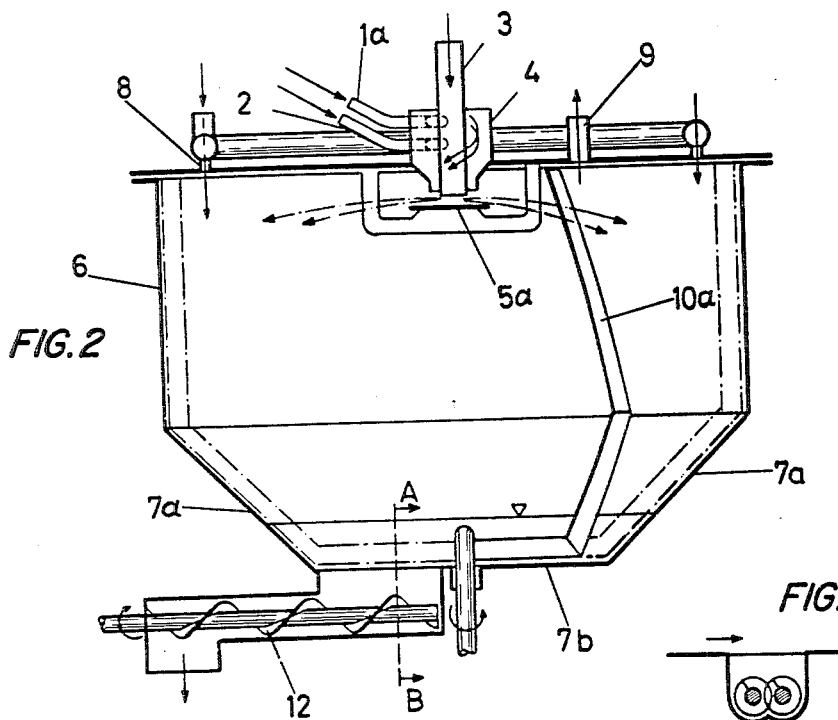
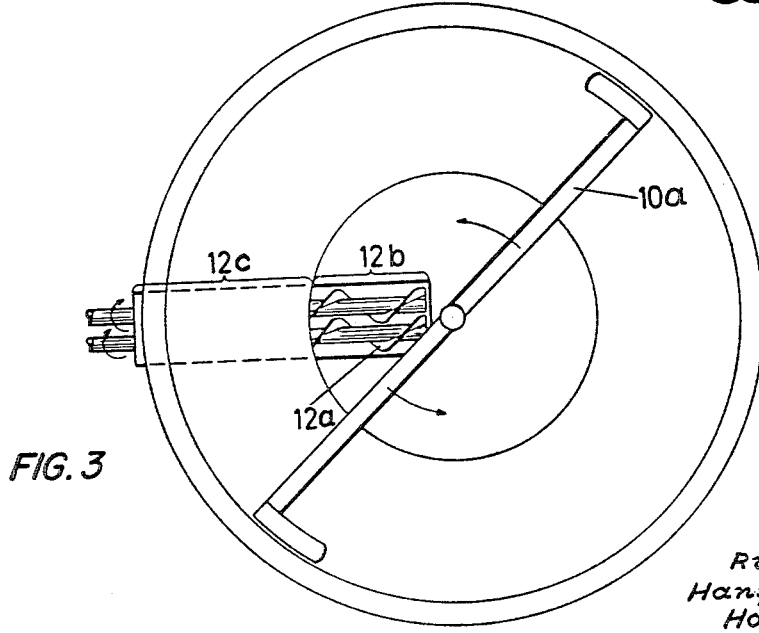
Rudolf Halder
Hansjürgen Ullrich
Horst Schreiber
INVENTORS

United States Patent Office 3,473,896
Patented Oct. 21, 1969

3,473,896
APPARATUS FOR PREPARING ALKALI METAL SALTS OF AROMATIC HYDROXY COMPOUNDS
Rudolf Halder, Hofheim, Taunus, Hansjurgen Ullrich, Frankfurt am Main, and Horst Schreiber, Hofheim, Taunus, Germany, assignors to Farbwerke Hoechst Aktiengesellschaft vormals Meister Lucius & Bruning, Frankfurt am Main, Germany, a corporation of Germany
Filed Aug. 11, 1966, Ser. No. 571,786
Claims priority, application Germany, Aug. 12, 1965, F 46,872
Int. Cl. B01t 4/00, 1/00
U.S. Cl. 23—285          9 Claims

ABSTRACT OF THE DISCLOSURE

An apparatus for preparing alkali metal salts of aromatic hydroxy compounds from liquid aromatic sulfonic acids and liquid alkali metal hydroxide. The apparatus includes a reaction vessel having a feed inlet through which a mixture of reactants is introduced. The feed inlet has means connected thereto for rapid and intimate mixing of dosed portions of the reactants and for conveying the mixture thereof through the inlet port into the vessel. A preferred mixing device is an annulus type reactor. Also connected to the feed inlet is a liquid spray distributor for spraying the mixture evenly throughout the reaction vessel. A gas inlet port and gas outlet port are also provided, the former being connected to a source of inert gas. The inert gas is circulated through the vessel to remove the heat of reaction. The vessel is further provided with a scraper or other suitable means for removing solids accumulations from its inner walls and a product discharge port having a conveyor apparatus associated therewith for removal of the reaction product.

---

Figure 1:
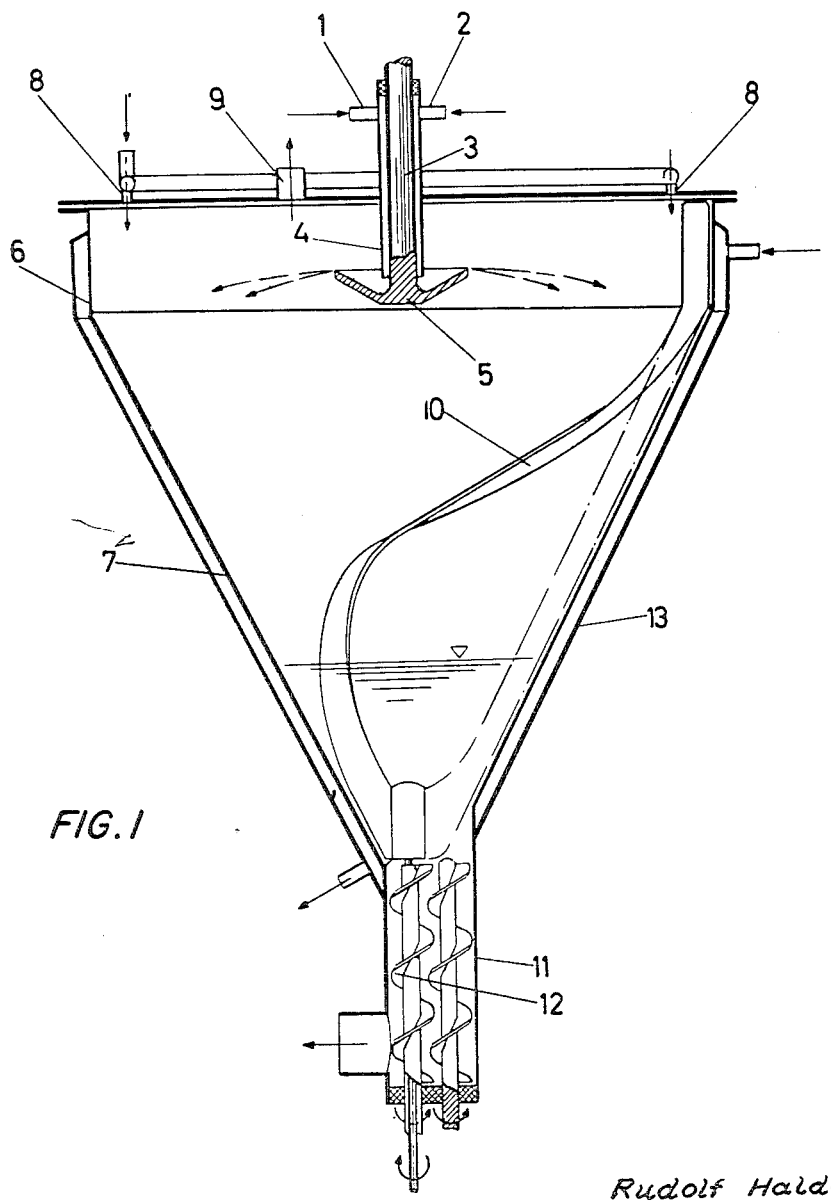

The invention described in U.S. patent application Ser. No. 459,819, filed on May 28, 1965, now Patent No. 3,426,083, provides a process for preparing alkali metal salts of aromatic hydroxy compounds from the corresponding aromatic sulfonic acids, a process wherein the aromatic sulfonic acids, in the molten state, are rapidly and uniformly mixed with liquid alkali metal hydroxide which has a strength of from 50 to 100%, preferably, from 70 to 95% by weight and which may contain water. The quantitative ratio between aromatic sulfonic acid and alkali metal hydroxide solution is such that at least 3 mols of alkali metal hydroxide per one sulfonic acid group linked to the aromatic nucleus are used. The aromatic sulfonic acids that are used for reaction in the process of the present invention are, for example, benzene-sulfonic acid, 1,3-benzene-disulfonic acid or 1- or 2-naphthalene-sulfonic acid.

The process of the invention may be carried out, for example, in the following manner: the aromatic sulfonic acid which may be in the molten state as directly obtained in the preparation, is introduced into a vessel or, if introduced in solid state into the vessel, it is heated to a temperature above the melting point so that it is in any case present in liquid form. The alkali metal hydroxide having the desired concentration is introduced into another vessel and therein heated to a temperature above its solidification point which is higher, the lower the water content is. Both liquids are then dosed by means of dosing devices and passed to a mixing device in which they are rapidly and thoroughly mixed to avoid local overheating. The heat set free by the reactions that take place, especially the neutralization, is so high that the whole mixture is strongly heated up, thus allowing the exchange reaction to proceed. From the mixing device, the reaction mixture which has not completely reacted, is passed into a relatively quiescent zone in which the reaction is completed to yield the corresponding alkali metal salt of the aromatic hydroxy compound. The reaction period is relatively short and may be in the range of less than one to about 30 seconds, depending on the temperature; if desired, it may also be longer. As zone of relative quiescence there may be used in the simplest case an unheated, insulated tube, the steam formed during the reaction serving as propellant, for this purpose it is also possible, however, to use conveyor bands or screws. Care must be taken, however, that the pressure does not exceed about 20 atmospheres to avoid decomposition of the alkali metal salts of the aromatic hydroxides that are formed.

With regard to apparatus, the mixing of both reaction components, which according to the invention has to be effected rapidly and uniformly, can be carried out in various ways, for example, by means of an annulus reactor or a two-substances-mixing chamber.

The two-substances-mixing chamber comprises, for example, a metal casing provided with two passages having considerably constricted terminal portions and serving for the feed of the reactants. These narrow channels open tangentially into a mixing chamber whereby high flow rates and effective speed gradients as to mixing are achieved in this chamber. The mixing chamber may be followed by a zone of relative quiescence.

The annulus reactor comprises a jacket tube into which passes a shaft having a diameter of such a size that an annulus of about 2 to 3 mm. between the shaft and the jacket tube is formed. With a rotating shaft, this annulus assures thorough mixing. The aromatic sulfonic acid and the alkali salt hydroxide solution having a strength of 50 to 100% by weight are fed through two separate conduits to the annulus reactor. The components enter at the head of the annulus and are thoroughly mixed by the shaft rotating in the jacket tube. To obtain immediate and thorough mixing of the two components that have been fed, it is of advantage to use a shaft the cross section of which in the reaction zone has the form of a polygon, for example, a quadrangle, hexagon, octagon or dodecagon.

From the mixing device, the reaction mixture may be introduced into a zone of relative quiescence in which the reaction is completed to yield the corresponding alkali metal salt of the aromatic hydroxy compound. As zone of relative quiescence there may be used in the simplest case an unheated, insulated tube, the steam formed during the reaction serving as propellant, for this purpose it is also possible, however, to use conveyor bands or screws.

We have now found an apparatus for preparing alkali metal salts of aromatic hydroxy compounds of the benzene- and naphthalene series from the corresponding aromatic sulfonic acids which comprises a mixing device for mixing the two reactants, aromatic sulfonic acid of the benzene or naphthalene series and alkali metal hydroxide, which is followed by a spraying device for spraying the reaction mixture obtained, a vessel of relative quiescence through which an inert gas or superheated steam passes and which is provided with stripping elements moving with the aid of mechanical means, and a discharging device positioned at the bottom of the vessel, for receiving the final product.

The mixing device may have various forms. An appropriate embodiment of the mixing device is, for example, the annulus reactor in which the cross section of the shaft in the reaction zone may have the form of a polygon, or a mixing nozzle.

When an annulus reactor is used as a mixing device, the spraying device is advantageously a spraying disc fixed to the quickly rotating mixing shaft. When a mixing nozzle is used, this nozzle may directly be followed by a two-substance spraying nozzle, having, if desired, a centrifuging plate.

The vessel of relative quiescence may be a cylinder having a conical bottom. It may, however, also be a cylinder having an even bottom or a torispherical head. Furthermore, the vessel of relative quiescence may be provided with a heating jacket.

The vessel of relative quiescence is also provided with conduits letting in and out the inert gas serving as heating medium, such as nitrogen or superheated steam. The heating medium may be introduced through conduits at the outer circumference of the cover of the vessel at a finite tangential speed component and it may likewise be let off through the cover near the axis of the vessel.

The discharging device comprises, preferably, a conveying twin screw which has advantageously two shafts carrying screws which rotate in the same sense thus stripping off each other. Owing to the extremely short period between mixing and distributing on the one hand, such an apparatus prevents sticky products from forming in the vessel of relative quiescence, and thus clogging, on the other hand, it is possible to heat even a product having a very low thermal conductivity, to the desired reaction temperature within a very short period by spraying it when entering the zone of relative quiescence, and by simultaneously introducing an inert gas acting as a heat carrier. Finally, the stripping elements prevent deposits and an accumulation of the product from forming in the vessel of relative quiescence and thus assure a favorable period of stay in the zone of relative quiescence. The discharging device enables an easy discharge, if required, under complete exclusion of air.

It is possible to combine stripping elements and discharging device in such a manner as to move both by means of a common drive, for example, a single motor.

In the accompanying drawings, FIGURE 1 is a longitudinal section of an embodiment of the apparatus and FIGURES 2, 3 and 4 illustrate another embodiment thereof, FIGURE 2 being a sectional view in elevation, FIGURE 3 a plan view partly in cross-section, and FIGURE 4 being a detail view taken on section A–B of FIGURE 2.

Referring now to FIGURE 1, the reactants are fed through short tubes 1 and 2 to an annulus reactor comprising a mixing shaft 3 and a cylindrical jacket 4, and are mixed therein. The mixture is then passed to a spraying disc 5 that is fixed to the mixing shaft 3, and then flung therefrom, in the form of fine drops, into the vessel of relative quiescence 6 having a conical bottom 7. Superheated steam passes through the vessel of relative quiescence, entering it through the short tubes 8 in axial direction to the axis of tht vessel, i.e. in spirals, and after having yielded its heat to the sprayed reaction mixture, it escapes through the outlet tube 9. The product which has been sprayed to the wall of the vessel, is stripped off by strippers 10 having a spiral shape and is simultaneously transported downwards to the discharging passage 11. The finished product is discharged by means of a twin conveying screw 12 which moves independently of the strippers and which may provide, when sufficiently sized, for a desired period of relative quiescence of the product. Drives for annulus reactor, spraying disc, strippers as well as screw have the usual forms.

FIGURE 2 and 3 show a longitudinal section and a top view, respectively, with the cover removed, of another embodiment of the apparatus which differs from the above-described one (see FIG. 1) mainly by the mixing and spraying devices (short tubes 1, 2 for feeding the reactants, tube 13 for supplying steam for spraying, twisting chamber 14, centrifuging plate 5a, furthermore, by the shape of the vessel of relative quiescence 6a comprising a conical portion 7a and a horizontal portion 7b,) correspondingly adapted strippers 10a as well as a horizontal arrangement of the twin screw 12a with the feeding portion 12b opening into the vessel, and an additional portion of relative quiescence 12c.

As compared to the apparatus described in the above-mentioned U.S. patent application Ser. No. 459,819, filed May 28, 1965, the apparatus of the present invention shows the following technical advance.

When the desired reaction temperature is intended to be reached only by means of the reaction heat and the perceptible reaction heat of the reactants, these latter two have to be heated to a relatively high temperature before being mixed. This heating to a relatively high temperature, however, results in a decomposition, thus increasing the pitch proportion (by promoting undesired side reactions) and inevitably reducing the yield.

When the reactants are, however, mixed at a comparatively low temperature, for example, at 160° C., more heat has subsequently to be introduced into the mixture, this procedure, however, being disadvantageous because, then, the mixture has the tendency to bake in the tube. To avoid these difficulties, the mixture is sprayed into a hot gas, preferably, into overheated steam, by means of the apparatus of the present invention.

By means of the apparatus of the present invention, it is possible to convert aromatic sulfonic acids, in particular those of the benzene or naphthalene series, for example, benzene, sulfonic acid, 1,3-benzene-disulfonic acid, or 1- or 2-naphthalene-sulfonic acid, into the corresponding aromatic hydroxy compounds (hydroxy-benzene, 1,3-dihydroxy-benzene, 1- or 2-hydroxynaphthalene).

We claim:

1. An apparatus for preparing alkali metal salts of aromatic hydroxy compounds from liquid aromatic sulfonic acids and liquid alkali metal hydroxides, comprising: a reaction vessel; a feed inlet in said vessel through which a mixture of reactants is introduced, said inlet having mixing and conveying means connected thereto for rapidly and intimately mixing portions of said reactants and for conveying the mixture thereof to said inlet port; a liquid spray distributor connected to said inlet port for causing said mixture to be sprayed evenly throughout said vessel, thereby distributing its heat of reaction; at least one gas inlet port in said vessel connected to a source of inert gas, and at least one gas outlet port in said vessel, said ports being for circulation of inert gas in said vessel; means to remove accumulated reaction product from the walls of said vessel; and a product discharge port having discharge means associated therewith for removal of reaction product.

2. An apparatus as claimed in claim 1, wherein the mixing means is a mixing nozzle.

3. An apparatus as claimed in claim 1, wherein the vessel is provided with a heating jacket.

4. The apparatus of claim 1, wherein said vessel is conical in shape, said feed inlet being centrally located in the top wall thereof and said product discharge port being located in the bottom apex thereof, the reacting spray falling downwardly from said feed inlet to said discharge port.

5. An apparatus as claimed in claim 1, wherein the mixing means is an annulus reactor.

6. An apparatus as claimed in claim 5, wherein the liquid spray distributor is a spraying disc fixed to a rotating mixing shaft of the annulus reactor.

7. An apparatus as claimed in claim 1, wherein the discharging means is a conveying screw.

8. An apparatus as claimed in claim 7, wherein the discharging means comprises two shafts carrying screws which rotate in the same phase thereby stripping off each other.

9. An apparatus as claimed in claim 7, wherein the means to remove accumulated reaction product and the discharging means are rotated by a common drive.

(References on following page)

References Cited

UNITED STATES PATENTS

| | | | |
|---|---|---|---|
| 2,378,314 | 6/1945 | Miller | 23—285 X |
| 2,736,754 | 2/1956 | Webb. | |
| 3,068,075 | 12/1962 | Boekemeier | 23—252 |

MORRIS O. WOLK, Primary Examiner

SIDNEY MARANTZ, Assistant Examiner

U.S. Cl. X.R.

23—252; 165—94; 259—6; 260—628